July 31, 1962 E. P. LUNKEN 3,047,007
BALL VALVE
Original Filed April 1, 1959 3 Sheets-Sheet 2

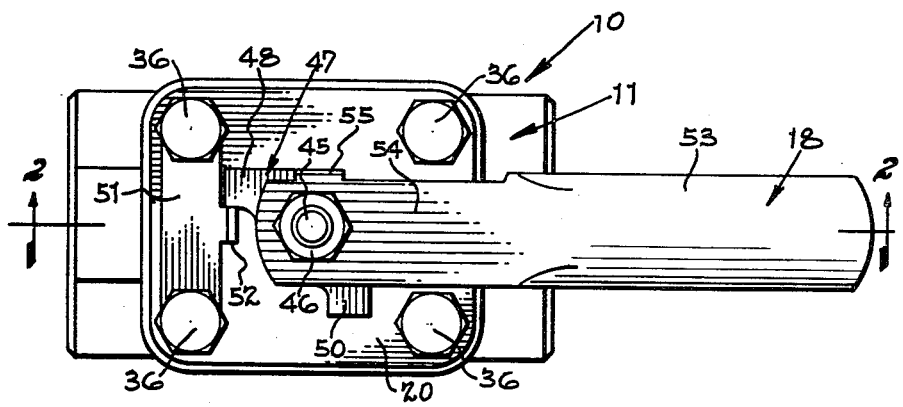
Fig. 1
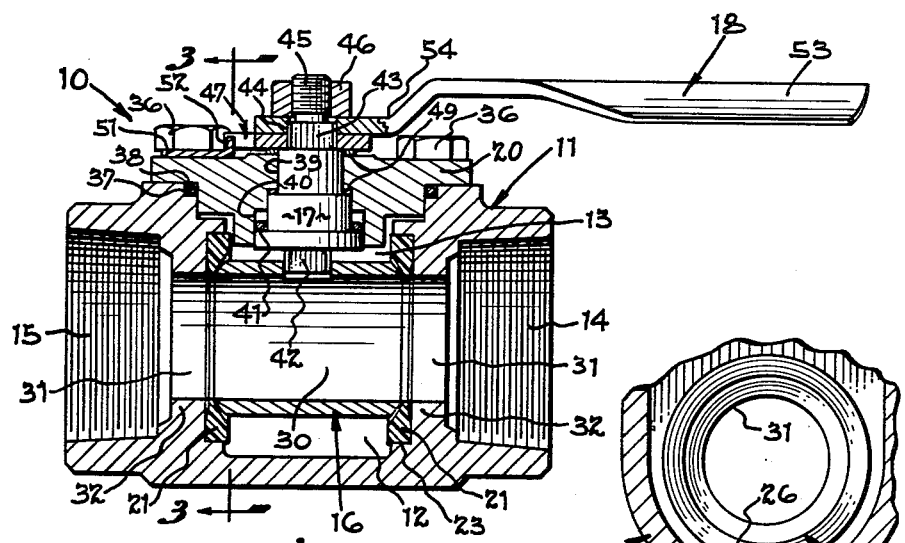
Fig. 2
Fig. 3
INVENTOR.
Edmund P. Lunken.
BY
Wood, Herron & Evans.
ATTORNEYS.

INVENTOR.
Edmund P. Lunken.
BY
Wood, Herron & Evans.
ATTORNEYS.

July 31, 1962 E. P. LUNKEN 3,047,007
BALL VALVE
Original Filed April 1, 1959 3 Sheets-Sheet 3

INVENTOR.
Edmund P. Lunken.
BY
Wood, Herron & Evans.
ATTORNEYS.

3,047,007
BALL VALVE
Edmund P. Lunken, Cincinnati, Ohio, assignor to The Lunkenheimer Company, Cincinnati, Ohio, a corporation of Ohio
Original application Apr. 1, 1959, Ser. No. 803,431. Divided and this application Aug. 4, 1960, Ser. No. 47,542
10 Claims. (Cl. 137—315)

The present invention relates to valves and is particularly directed to a novel valve of the type employing a rotatable ball, or spherical plug type closure member for controlling fluid communication between inlet and outlet passageways in the valve body. This is a divisional application of application Serial No. 803,431, filed April 1, 1959, now abandoned.

It has previously been proposed to provide valves having inlet and outlet passages in the valve body adapted to be selectively interconnected by means of a rotatable ball of substantially spherical form and having a diametral bore. The rotary ball, or plug, is adapted to be turned to an "open" position in which the bore is aligned with the inlet and outlet passageways so that there is an unobstructed passageway for fluid flow through the valve. The plug is also adapted to be rotated to a position in which the bore through the plug is disposed transversely of the valve passageways and an unbroken spherical surface of the ball extends across the inlet and outlet ports blocking fluid flow.

The prior art ball valves have, however, been subjected to various defects. For example, many of these valves have required that accurately machined spherical seats be formed in the valve body. This machining operation is extremely expensive and unless it is performed with the utmost precision, the valve does not provide a leak-proof seal. Other ball valves have been proposed using resilient seats in place of machined metal seats. However, these prior art constructions have either required that the valve be removed from the service line when it became necessary to replace worn seats; or the valve bodies were excessively large, making them disadvantageous for many applications.

The principal object of the present invention is to provide a novel ball type valve having a flattened ball and elastically yieldable seats which can readily be inserted in or removed from the top of the valve without removing the valve from a line.

Another object of the present invention is to provide a ball type valve which is effective to provide a leak-proof seal over a wide range of pressures; for example, from zero to several thousand pounds.

Another object of the present invention is to provide a novel ball type valve in which the ball and seats are configurated so that when the ball is inserted in the valve the seats are automatically prestressed or preloaded a sufficient amount to provide a leak-proof seal at very low fluid pressures.

More particularly, a preferred form of valve constructed in accordance with the principles of the present invention comprises a valve body having conventional inlet and outlet ports disposed on opposite sides of a valve chamber. The valve chamber, which is accessible through a top opening, includes recesses surrounding the inlet and outlet ports and elastically yieldable annular seat rings formed of a suitable material, such as "Teflon," "nylon," "buna N," or the like, are inserted in each of these recesses and are disposed for engagement with the surface of a ball closure member. The ball closure member is generally spherical, except for the top and bottom portions which are preferably flat parallel planes, and is provided with a diametral bore for providing a fluid passageway through the valve. Thus, the plug is substantially a spherical zone having a transverse bore for a fluid way.

The ball further includes an aperture extending from the top surface of the valve through to the valve bore. As is explained below, this aperture performs a double function in that in normal operation, it receives the valve stem providing the driving engagement between the stem and ball; and during assembly of the valve it is adapted to receive a projection formed on the valve handle for facilitating rotation of the ball to apply an initial "preload" pressure to the valve seats.

In assembling the present valve, the valve bonnet is removed and the seats are placed in their respective recesses through the top opening of the valve body. Thereafter, the plug is aligned with its opposed flat faces parallel with the inner edges of the seats, the dimension of the ball across the flat sides being less than the space between the seats in the valve body. The plug is then inserted into the valve body in this position with the plug bore communicating with the top opening of the valve. The valve handle is inserted into the plug bore, a projection on the handle engaging the transverse aperture in the plug which thereby provides a gripping surface enabling the handle to rotate the plug about a vertical axis.

When the plug is rotated in this manner, the spherical surface of the plug is forced into engagement with the deformable seats. The seats are slightly deformed and are thus placed under an initial load, or pressure, so that they are in firm contact with the surface of the ball and adjacent walls of the body recesses and are effective to provide a leak-proof seal when the valve is closed.

In the final assembly step, the valve is rotated about a horizontal axis to bring the flat top of the plug to its proper position for engagement with the stem. The bonnet and stem assembly are then replaced and the valve is in a condition for operation. It will readily be appreciated that the assembly, or disassembly of a valve, can be completed while the valve is connected to the line.

One of the principal advantages of the present valve construction is that it is economical to manufacture and assemble since no precise machining or lapping operations are necessary in connection with the valve seats. Moreover, the seats are automatically preloaded to the correct pressure by the rotation of the plug during assembly of the valve.

Another advantage of the present valve construction is that it provides a very effective seal over a wide pressure range. The present valve seats are formed of an elastically yieldable material and are constructed so that under small loads the seats contact the ball along a thin band. However, as the sealing pressure increases, the width of contact between the sealing ring and valve also increases so that the unit contact pressure between the ball and seat remains relatively constant or increases within predetermined limits so that the unit contact pressure in no case reaches the surface yielding pressure of the seat at which pressure the seat surface would deform permanently.

More particularly, the present invention contemplates a seat formed of an elastically yieldable material configurated to form a ring having an arcuate ball engaging surface curved at a substantially larger radius than the radius of curvature of the ball. The opposite side of the ring is tapered and is spaced from the adjacent supporting surface of the valve body. As the ball is subjected to an increased fluid pressure, the ball engaging surface of the seat undergoes a deformation increasing the area of surface contact with the ball. Simultaneously, the seat is elastically deformed so that the unit pressure on the ball engaging surface at all times remains below the surface yield pressure of the seat.

From the user's point of view the present valve is highly advantageous since if the valve seats should require replacement after a period of use, the valve can readily be disassembled and the seats replaced without removing the valve from the line.

A still further advantage of the present valve construction is that when the plug is inserted or removed from the valve it does not scrape the valve seats in such a manner that the seats might become cut or nicked. Whenever the present ball is brought into and out of engagement with the valve seat, it is through a smooth rotating conact of the ball which eliminates possible injury to the seats.

These and other objects and advantages of the present invention will be more readily apparent from the following detailed description of the drawings illustrating a preferred embodiment of the invention.

In the drawings:

FIGURE 1 is a top plan view of a valve constructed in accordance with the principles of the present invention.

FIGURE 2 is a cross-sectional view taken along line 2—2 of FIGURE 1.

FIGURE 3 is a cross-sectional view taken along line 3—3 of FIGURE 2.

Figure 4:
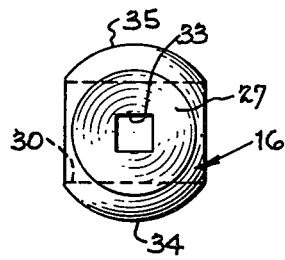
FIGURE 4 is a top plan view of the ball.

One preferred form of valve 10 constructed in accordance with the present invention comprises a body 11 formed of any suitable material, such as cast stainless steel, bronze, carbon steel, or the like. The valve body is provided with a central valve chamber 12 having a top opening 13 and a pair of opposed bores 14 and 15 adapted to function either as inlet or outlet fluid passageways, there being no preferred direction of fluid flow through the valve. As is shown in FIGURE 2, the bores are threaded in a conventional manner for connecting the valve to the threaded ends of the inlet and outlet pipe sections.

Valve 10 further comprises a rotatable spherical plug, or ball 16, an actuating stem 17 for rotating the ball, and handle 18 for turning the stem. The stem and handle are mounted on a bonnet 20 effective to seal the top opening 13 of the valve body. The present valve further comprises two elastically deformable annular sealing rings, or seats 21, mounted in suitable recesses in the valve body in sealing engagement with the ball and body.

Figure 9:
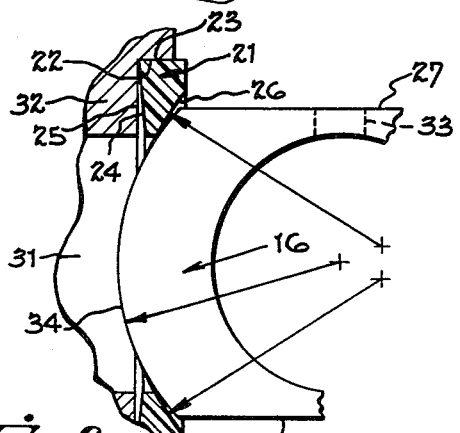
FIGURE 9 is an enlarged cross-sectional view of the ball and seat ring taken along line 9—9 of FIGURE 8.

More particularly, as is best shown in FIGURE 2, valve body 11 is provided with two square cornered annular recesses surrounding each of the ports 31—31 formed in internal flange 32—32 adjacent to the ends of valve chamber 12. Each of these recesses is adapted to receive one of the seating rings 21. These seating rings are preferably formed of a yieldable material, such as "Teflon," "buna N," "nylon," or the like. The seat rings in plan are circular in configuration as is shown in FIGURE 3. In cross-section, each of the rings includes an outer peripheral surface 23 which engages the circular wall of recess 22. The ring further includes a rear face 24 which is slightly tapered as is shown in FIGURE 9, so as to normally be spaced from the outer annular wall 25 of recess 22. The ring also is provided with a front, or ball engaging face 26 which is curved but not spherical. The radius of curvature of this face is substantially larger than the radius of ball 16. Also to facilitate rotation of the ball during preloading of the seal, the center of curvature of the sealing ring is not concentric with the center of the ball, but rather the locus of the center of curvature of the face 26 lies on a circle which is spaced on the far side of the center of the ball as is shown in FIGURE 9.

As is explained in detail below, the configuration and dimensions of the seat ring are related to the mechanical properties of the material so that when the ball valve is inserted in a line and fluid pressure is applied to the ball and hence to the sealing ring, the sealing ring deforms providing a greater contact area whereby the unit contact pressure on the seal remains substantially constant or increases as required to effect a seal over a wide range of fluid pressures. However, the unit pressure on the seal is always below the surface yield pressure of the seat material. Consequently, the seat provides an effective seal without any appreciable permanent deformation of its surface which would otherwise ultimately produce leakage.

The rotatable plug, or ball, 16 which cooperates with seats 21 is of generally spheroidal form. The ball 16 is formed of any suitable material, such as stainless steel, bronze, or the like, and is provided with a flat top portion 27 and a flat bottom portion 28 for minimizing the vertical or height dimension of the ball and for facilitating insertion of the ball in the valve body through the top opening 13. Ball 16 is further configurated to form a circular bore, or fluid passageway 30 which extends through the ball and is of substantially the same diameter as the inlet and outlet ports 31—31 of the valve.

Figure 5:
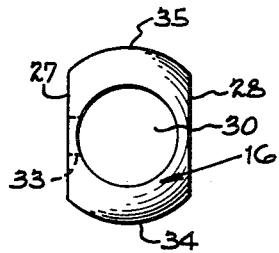
FIGURE 5 is a side elevational view of the ball as it appears looking inwardly from a fluid pipe line with the valve in the fully open position.

As is best shown in FIGURES 4 and 5, the top face 27 of the ball is provided with a rectangular opening 33 which extends completely through the top wall of the valve and communicates with the bore 30. This opening 33 is adapted to provide a double function in that, as handle 18 to provide a ready means for rotating the ball and loading the seats 21 during assembly of the valve, and additionally, in normal operation of the valve, the opening receives the end of stem 17, thereby providing a mechanical connection permitting the handle to rotate the plug through the valve stem. As is shown in FIGURES 2 and 9, the radius of the spherical portions of the ball 16 is substantially less than the radius of ball engaging seat face 26 of seat members 21.

Figure 8:
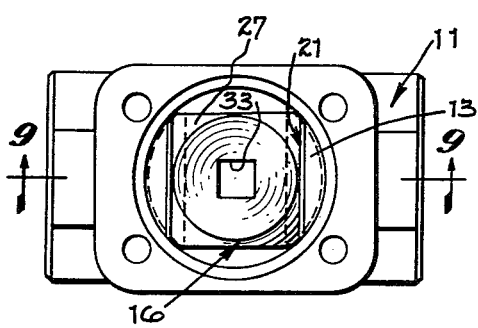
FIGURE 8 is a top plan view similar to FIGURE 6 showing the ball shifted to its normal operative closed position.

In the open position shown in FIGURE 2, the ball is rotated so that its bore 30 is coaxial with ports 31—31 of the valve body, providing an uninterrupted passageway for fluid flow through the valve. With the ball in this position, the seat rings engage the spherical portions of the ball surrounding the ends of bore 30. When the ball is rotated about a vertical axis by rotation of stem 17, bore 30 is shifted to a direction transverse to the axis ports 31—31 as shown in FIGURE 8. With the ball in this position, the uninterrupted spherical portions 34 and 35 of the ball extend across the central openings of seat rings 21. The pressure engagement of face 26 of these seating rings with ball 16 and back 22 with the body 25 effectively seals the valve against the fluid flow.

The bonnet 20 of the present valve is generally of rectangular outline configuration and is adapted to be mounted over the top opening 13 of the valve by means of a plurality of bolts 36 which pass through suitable openings formed on the bonnet and threadably engage threaded bores in the valve body. The upper portion of the valve body is provided with an annular recess 37 for receiving an O ring 38 which is compressed between the valve body and bonnet 20 to provide a fluid tight seal between these two members. Bonnet 20 is provided with a vertical bore 39 for receiving and rotatably journalling stem 17. This bore 39 is provided with an enlargement 40 for receiving an O ring 41 effective to provide a fluid tight seal between the stem and bonnet.

Stem 17 is of generally cylindrical configuration and is provided with a square end 42 disposed to loosely fit within opening 33 in the bore. Thus, the square end 42 of the valve stem is dimensioned so that when the valve stem is rotated, it positively rotates ball 16, and yet there is sufficient play between the stem and ball to permit limited movement of the ball relative to the valve seats.

The upper end 43 of the stem is also preferably square. This end projects outwardly from the top of the bonnet and is adapted to be inserted in a square opening 44 provided in valve handle 18. The outer end 45 of the stem is threaded to receive a nut 46 for holding the valve stem and handle in assembled relationship.

A handle stop plate 47 having a square opening and two angulated arms 48 and 50 is also fitted over the upper portion of the stem 17, the stop plate being disposed between the top surface of the bonnet and handle 18. Suitable thrust washers 49—49 are disposed between the stem and stop plate 47 and between the stem and bonnet. The arms 48 and 50 of the stop plate are adapted to cooperate with a stationary stop 51 which is bolted to the top face of the bonnet by means of bolts 36. Stationary stop member 51 includes an upstanding stop finger 52, this finger being best shown in FIGURES 1 and 2. Rotatable stop member 47 and stationary stop member 51 cooperates so that when the valve handle 18 is rotated to bring the valve into its open position, the valve handle is shifted in a counterclockwise position, shown in FIGURE 1, until arm 50 engages stop member 52. In order to close the valve, handle 18 is rotated in a clockwise direction, in FIGURE 1, until arm 50 engages stop finger 52.

As is best shown in FIGURES 1 and 2, handle 18 is formed of any suitable material, such as carbon steel. The handle includes an arcuate portion 53 which is slightly off-set from the flat stop member engaging portion 54. Portion 54 of the handle is provided with an outwardly extending tang or projection 55 of slightly smaller width than the width of square opening 33 formed in ball 16. The width of handle portion 54 is smaller than the diameter of bore 30 in the ball so that, as is explained below, during the assembly of the valve, the inner end portion 54 of the handle is adapted to be inserted in bore 30 of the ball and the tang portion 55 of the handle inserted within square opening 33 of the ball.

Figure 6:
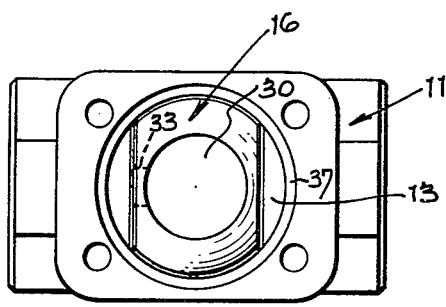
FIGURE 6 is a top plan view of the valve body with the bonnet removed showing the ball in its initial position for insertion in the valve body.

To assemble the valve, the two seat rings 21 are inserted through top opening 13 of the valve body and are placed in recesses 22 with the front bearing faces 24 of each of the seats facing valve chamber 12. The ball 16 is then disposed above top opening 13 with the flat top and bottom surfaces 27 and 28 of the ball extending parallel to the inner ends of the seats as is shown in FIGURE 6. The ball is then dropped downwardly into the valve chamber 12. The ball is easily inserted in this manner since the vertical dimension of the ball between faces 27 and 28 is less than the distance between the opposing seats.

Figure 10:
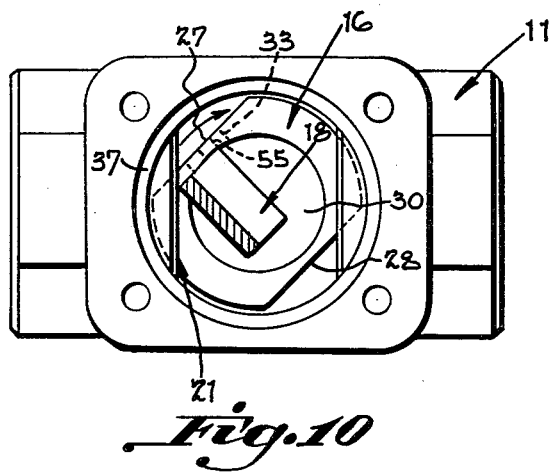
FIGURE 10 is a top view of the housing and ball showing the manner in which the ball is rotated to its intermediate position by means of the valve handle.

In the next step, inner portion 54 of handle 18 is inserted into bore 30 of the ball, as is shown in FIGURE 10, with the tang 55 in engagement with opening 33 of the ball. The handle thus provides appreciable leverage for rotating the ball 90 degrees about a vertical axis to bring the spherical portions 34 and 35 of the ball into engagement with the valve seats, as is shown in FIGURE 7, the full diameter of the ball being slightly greater than the normal seat spacing.

The insertion of the handle into the ball valve thus greatly facilitates preloading the valve seats, since during this rotative movement of the ball, the sealing rings 21 are deflected sufficiently to place the rings under a preload pressure in which the seats contact the ball along narrow annuli. The optimum preload pressure varies from a few pounds to over 100 pounds depending upon such factors as the seat material, intended service conditions of the valve, and the like.

Figure 7:
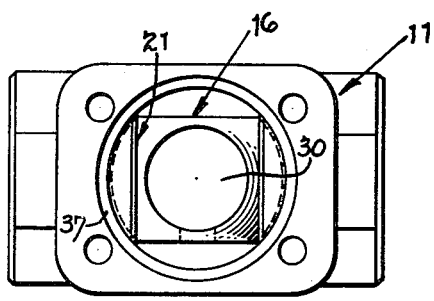
FIGURE 7 is a top plan view similar to FIGURE 6 showing the ball rotated to an intermediate seat loading position.

After the ball has been brought to the position shown in FIGURE 7 (i.e. operative position, wherein the axis of bore is in the same plane as the axis of the ports) and the seats have been compressed, the handle is withdrawn and the ball is rotated about a horizontal axis coaxial with the ports 31. Thereafter, the bonnet and stem are assembled and the bonnet is placed over top opening 13 with the square end 42 of the stem being disposed within opening 33 of the ball. The bonnet and stationary stop member 51 are secured in place by means of bolts 36 and movable stop 47 and handle 18 are placed over the upper end of the stem and are secured in place by means of nut 46. The valve is then ready to be inserted into the line by connecting suitable pipes to threaded bores 14 and 15 of the valve.

After the valve has been placed in service, it can readily be disassembled without removing it from the line to replace any defective or worn seats, or the like. Specifically, to disassemble the valve, it is only necessary to remove the bonnet and handle and rotate the plug in the reverse manner to the manner in which the plug is rotated for assembly. Thus, the plug is first rotated about the port axis to bring bore 30 to the position shown in FIGURE 7 and the plug is then rotated at 90 degrees about a vertical axis to bring the flat top and bottom portion into registry with the inner ends of the seats after which the plug is completely free from contact with the seats and can readily be lifted from the valve chamber. After the new seats have been inserted, or other repairs made, the maintenance man can readily reassemble the valve in the manner described above. Since the valve handle having the projection for rotating the ball to load the seats forms an element of the valve, the repairman is always assured of having the necessary tool right at hand.

When the valve is in service, the valve is opened by positioning the handle as shown in FIGURES 1 and 2 to align bore 30 with inlet and outlet ports 31 of the valve body. In this position, the valve provides an unobstructed passageway for fluid flow through the line. To close the valve, the handle is rotated 90 degrees to position bore 30 transversely of ports 31. It will be appreciated that the ball 16 is at all times supported solely by its engagement with seat rings 31. Consequently, the ball floats between these seat rings and is adapted to be displaced relative to to the rings in response to fluid pressure.

When the valve is rotated to the closed position, the side thrust due to the fluid pressure on the inlet side of the valve forces the ball 16 against the seat on the downlet side of the valve. This transverse movement of the valve deforms the seat in two ways to provide a greater total sealing force. In the first place, since the radius of ball 16 is substantially smaller than the radius of face 26 of the sealing ring, when the ball valve is shifted against the ring, the surface 26 is deformed to increase the width of the annular band of contact between the ball and seat. Additionally, however, the free inner surface of the ring is shifted outwardly under an elastic deformation. By properly relating the amount of the two deformations, the area of contact increases with increase in pressure so that the unit surface contact pressure remains below the yield pressure of the seat material.

Figure 11:
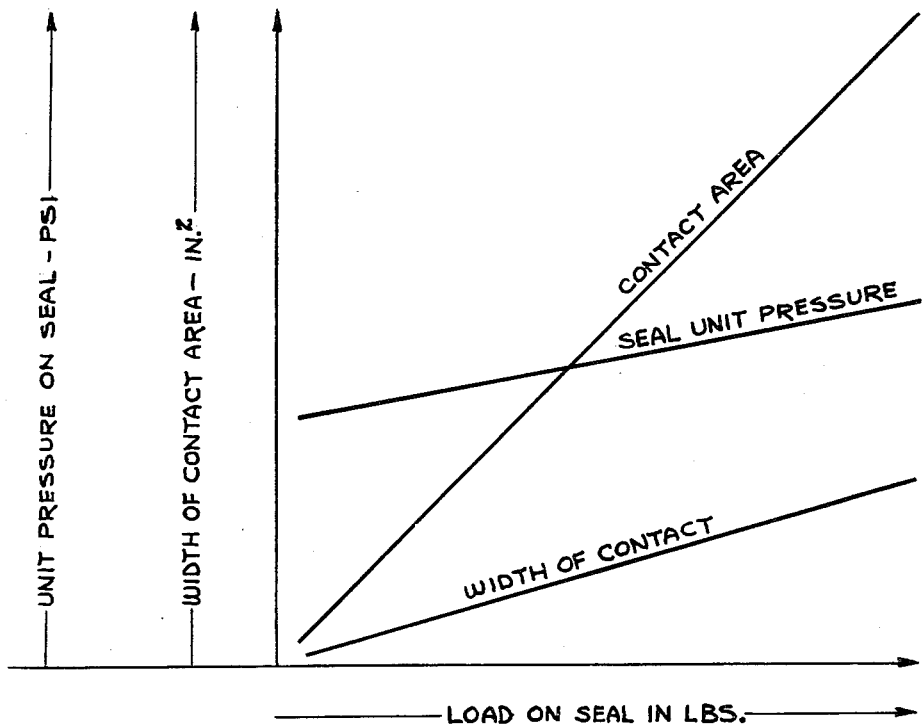
FIGURE 11 is a graph showing the general relationship of the load on a typical seat ring to the contact area of the seat, and the unit pressure on the seat.

FIGURE 11 illustrates the manner in which a typical seat of the present invention functions under a varying load. It will readily be appreciated, however, that this is merely exemplary; and that seats of other materials and of different dimensions will not follow exactly the same curves. As is shown in FIGURE 11, the area of contact between the seat ring and ball increases as the total load on the seal is increased in such a manner that throughout the entire operating pressure range of the valve (e.g. from 0-1000 p.s.i.) the sealing unit pressure is kept below the surface yield of the seat material. Consequently, there is no damage to the seat material and the seat is therefore effective to provide a fluid tight seal for indefinite periods of use.

From the foregoing disclosure of the general principles of the present invention and the above description of a preferred embodiment, those skilled in the art will readily comprehend various modifications to which the invention is susceptible. Therefore, I wish to be limited only by the scope of the following claims.

What is claimed is:

1. A valve comprising a valve body having a valve chamber accessible from the top of said body and inlet and outlet fluid ports disposed at opposite sides of the valve chamber, said body having an annular recess surrounding each of said fluid ports, an elastically yieldable seat ring disposed within each of said annular recesses and having a seat surface disposed within said valve chamber, a rotatable closure member of generally spheroid form disposed within said seat chamber in engagement with said seat rings, said rotatable closure member having a bore formed therein for registry with said inlet and outlet ports in the open position of the valve, said rotatable closure member having a reduced vertical dimension transversely of said fluid bore, said vertical dimension being less than the spacing of said seats, the spacing of the seats and the dimensions of the closure member being so related that the closure member preloads the seats in all operative positions of the closure member whereby said rotatable closure member is insertable within said valve chamber by aligning the vertical dimension of said member transversely of said seats and is effective to preload said seats upon rotation in a direction about an axis transverse to an axis through said transverse fluid bores.

2. A valve comprising a valve body having a valve chamber accessible from the top of said body and inlet and outlet fluid ports disposed at opposite sides of the valve chamber, said body having an annular recess surrounding each of said fluid ports, an elastically yieldable seat ring disposed within each of said annular recesses and having a seat surface disposed within said valve chamber, a rotatable closure member of generally spheroid form disposed within said seat chamber in engagement with said seat rings, said rotatable closure member having a bore formed therein for registry with said inlet and outlet ports in the open position of the valve, said rotatable closure member having a reduced vertical dimension transversely of said fluid bore, said vertical dimension being less than the spacing of said seats, the spacing of the seats and the dimensions of the closure member being so related that the closure member preloads the seats in all operative positions of the closure member, whereby said rotatable closure member is insertable within said valve chamber by aligning the vertical dimension of said member transversely of said seats and is effective to preload said seats upon rotation in a direction about an axis transverse to an axis through said transverse fluid bore, and means disposed within the wall of said bore for cooperative engagement with a member for rotating said plug.

3. A valve comprising a valve body having a valve chamber accessible from the top of said body and inlet and outlet fluid ports disposed at opposite sides of the valve chamber, said body having an annular recess surrounding each of said fluid ports, an elastically yieldable seat ring disposed within each of said annular recesses and having a seat surface disposed within said valve chamber, a rotatable closure member of generally spheroid form disposed within said seat chamber in engagement with said seat rings, said rotatable closure member having a bore formed therein for registry with said inlet and outlet ports in the open position of the valve, said rotatable closure member having a reduced vertical dimension transversely of said fluid bore, said vertical dimension being less than the spacing of said seats, the spacing of the seats and the dimensions of the closure member being so related that the closure member preloads the seats in all operative positions of the closure member whereby said rotatable closure member is insertable within said valve chamber by aligning the vertical dimension of said member transversely of said seats and is effective to preload said seats upon rotation in a direction about an axis transverse to an axis through said transverse fluid bores, and means disposed within the wall of said bore for cooperative engagement with a member for rotating said plug, said last named means comprising an opening formed in the wall of said bore.

4. A valve comprising a valve body having a valve chamber accessible from the top of said body and inlet and outlet fluid ports disposed at opposite sides of the valve chamber, said body having an annular recess surrounding each of said fluid ports, an elastically yieldable seat ring disposed wtihin each of said annular recesses and having a seat surface disposed within said valve chamber, a rotatable closure member of generally spheroid form disposed within said seat chamber in engagement with said seat rings, said rotatable closure member having a bore formed therein for registry with said inlet and outlet ports in the open position of the valve, said rotatable closure member having planar parallel top and bottom surfaces, the distance between said top and bottom surfaces being less than the spacing of said seats, the spacing of the seats and the dimensions of the closure member being so related that the closure member preloads the seats in all operative positions of the closure member, whereby said rotatable closure member is insertable within said valve chamber by aligning the top and bottom of said member parallel with and between said seats and is effective to preload said seats upon rotation in a direction about an axis transverse to an axis through said transverse fluid bores.

5. A valve comprising a valve body having a valve chamber accessible from the top of said body and inlet and outlet fluid ports disposed at opposite sides of the valve chamber, said body having an annular recess surrounding each of said fluid ports, an elastically yieldable seat ring disposed within each of said annular recesses and having a seat surface disposed within said valve chamber, a rotatable closure member of generally spheroid form disposed within said seat chamber in engagement with said seat rings, said rotatable member being shiftable against said seat rings in response to fluid pressure, said seating rings being deformable, whereby the unit surface pressure upon said seats never exceeds the surface yield pressure of said seats, said rotatable closure member having a bore formed therein for registry with said inlet and outlet ports in the open position of the valve, said rotatable closure member having a reduced vertical dimension transversely of said fluid bore,, said vertical dimension being less than the spacing of said seats, the spacing of the seats and the dimensions of the closure member being so related that the closure member preloads the seats in all operative positions of the closure member whereby said rotatable closure member is insertable within said valve chamber by aligning the vertical dimension of said member transversely of said seats and is effective to preload said seats upon rotation in a direction about an axis transverse to an axis through said transverse fluid bores.

6. A valve comprising a valve body having a valve chamber accessible from the top of said body and inlet and outlet fluid ports disposed at opposite sides of the valve chamber, said body having an annular recess surrounding each of said fluid ports, an elastically yieldable seat ring disposed within each of said annular recesses and having a seat surface disposed within said valve chamber, a rotatable closure member of generally spheroid form disposed within said seat chamber in engagement with said seat rings, said rotatable closure member being supported solely by said seats, said rotatable closure member having a bore formed therein for registry with said inlet and outlet ports in the open position of the valve, said rotatable closure member having a reduced vertical dimension transversely of said fluid bore, said vertical dimension being less than the spacing of said seats, the spacing of the seats and the dimensions of the closure member being so related that the closure member preloads the seats in all operative positions of the closure member whereby said rotatable closure member is insertable within said valve chamber by aligning the vertical dimension of said member transversely of said seats and is effective to preload said seats upon rotation in a direction about an axis transverse to an axis through said transverse fluid bores.

7. A valve comprising a valve body having a valve chamber accessible from the top of said body and inlet and outlet fluid ports disposed at opposite sides of the valve chamber, said body having an annular recess surrounding each of said fluid ports, an elastically yieldable seat ring disposed within each of said annular recesses and having a seat surface disposed within said valve chamber, a rotatable closure member of generally spheroid form disposed within said seat chamber in engagement with said seat rings, stem means for rotating said closure member, said rotatable closure member having an aperture for cooperative engagement with said stem and a bore formed therein for registry with said inlet and outlet ports in the open position of the valve, said rotatable closure member having a reduced vertical dimension transversely of said fluid bore, said vertical dimension being less than the spacing of said seats, the spacing of the seats and the dimensions of the closure member being so related that the closure member preloads the seats in all operative positions of the closure member whereby said rotatable closure member is insertable within said valve chamber by aligning the vertical dimension of said member transversely of said seats and is effective to preload said seats upon rotation in a direction about an axis transverse to an axis through said transverse fluid bores.

8. A valve comprising a valve body having a valve chamber accessible from the top of said body and inlet and outlet fluid ports disposed at opposite sides of the valve chamber, said body having an annular recess surrounding each of said fluid ports, an elastically yieldable seat ring disposed within each of said annular recesses and having a seat surface disposed within said valve chamber, a rotatable closure member of generally spheroid form disposed within said seat chamber in engagement with said seat rings, stem means for rotating said closure member, said rotatable closure member having an aperture for cooperative engagement with said stem and a bore formed therein for registry with said inlet and outlet ports in the open position of the valve, said rotatable closure member having a reduced vertical dimension transversely of said fluid bore, said vertical dimension being less than the spacing of said seats, the spacing of the seats and the dimensions of the closure member being so related that the closure member preloads the seats in all operative positions of the closure member whereby said rotatable closure member is insertable within said valve chamber by aligning the vertical dimension of said member transversely of said seats and is effective to preload said seats upon rotation in a direction about an axis transverse to an axis through said transverse fluid bores, said aperture in the closure member communicating with said bore, whereby said aperture is adapted for cooperative engagement with a member for rotating said closure member about said transverse axis.

9. A valve comprising a valve body having a valve chamber accessible from the top of said body and inlet and outlet fluid ports disposed at opposite sides of the valve chamber, said body having an annular recess surrounding each of said fluid ports, an elastically yieldable seat ring disposed within each of said annular recesses and having a seat surface disposed within said valve chamber, a rotatable closure member of generally spheroid form disposed within said seat chamber in engagement with said seat rings, a stem for rotating said closure member, an elongated handle engageable with said stem, said rotatable closure member having an aperture for cooperative engagement with said stem and a bore formed therein for registry with said inlet and outlet ports in the open position of the valve, said rotatable closure member having a reduced vertical dimension transversely of said fluid bore said vertical dimension being less than the spacing of said seats, the spacing of the seats and the dimensions of the closure member being so related that the closure member preloads the seats in all operative positions of the closure member whereby said rotatable closure member is insertable within said valve chamber by aligning the vertical dimension of said member transversely of said seats and is effective to preload said seats upon rotation in a direction about an axis transverse to an axis through said transverse fluid bores, said aperture in the closure member communicating with said bore, said handle being receivable within said bore and having a projection engageable with said aperture whereby said handle is effective to rotate said closure member about said transverse axis.

10. A valve comprising a valve body having a valve chamber accessible from the top of said body and inlet and outlet fluid ports disposed at opposite sides of the valve chamber, said body having an annular recess surrounding each of said fluid ports, an elastically yieldable seat ring disposed within each of said annular recesses and having a seat surface disposed within said valve chamber, a rotatable closure member of generally spheroid form disposed within said seat chamber in engagement with said seat rings, a stem for rotating said closure member, an elongated handle having an inner end engageable with said stem, said rotatable closure member having an aperture for cooperative engagement with said stem and a bore formed therein for registry with said inlet and outlet ports in the open position of the valve, said rotatable closure member having a reduced vertical dimension transversely of said fluid bore, said vertical dimension being less than the spacing of said seats, the spacing of the seats and the dimensions of the closure member being so related that the closure member preloads the seats in all operative positions of the closure member whereby said rotatable closure member is insertable within said valve chamber by aligning the vertical dimension of said member transversely of said seats and is effective to preload said seats upon rotation in a direction about an axis transverse to an axis through said transverse fluid bores, said aperture in the closure member communicating with said bore, said handle being receivable within said bore and having a projection formed on the inner end of said handle engageable with said aperture whereby said handle is effective to rotate said closure member about said transverse axis.

References Cited in the file of this patent
UNITED STATES PATENTS

| 2,333,424 | Humphreys | Nov. 2, 1943 |
| 2,373,628 | Gleeson | Apr. 10, 1945 |
| 2,864,398 | Green | Dec. 16, 1955 |
| 2,895,710 | Sanctuary | July 21, 1957 |